E. R. THOMAS.
STEERING WHEEL.
APPLICATION FILED MAY 16, 1921.
1,420,462.
Patented June 20, 1922.
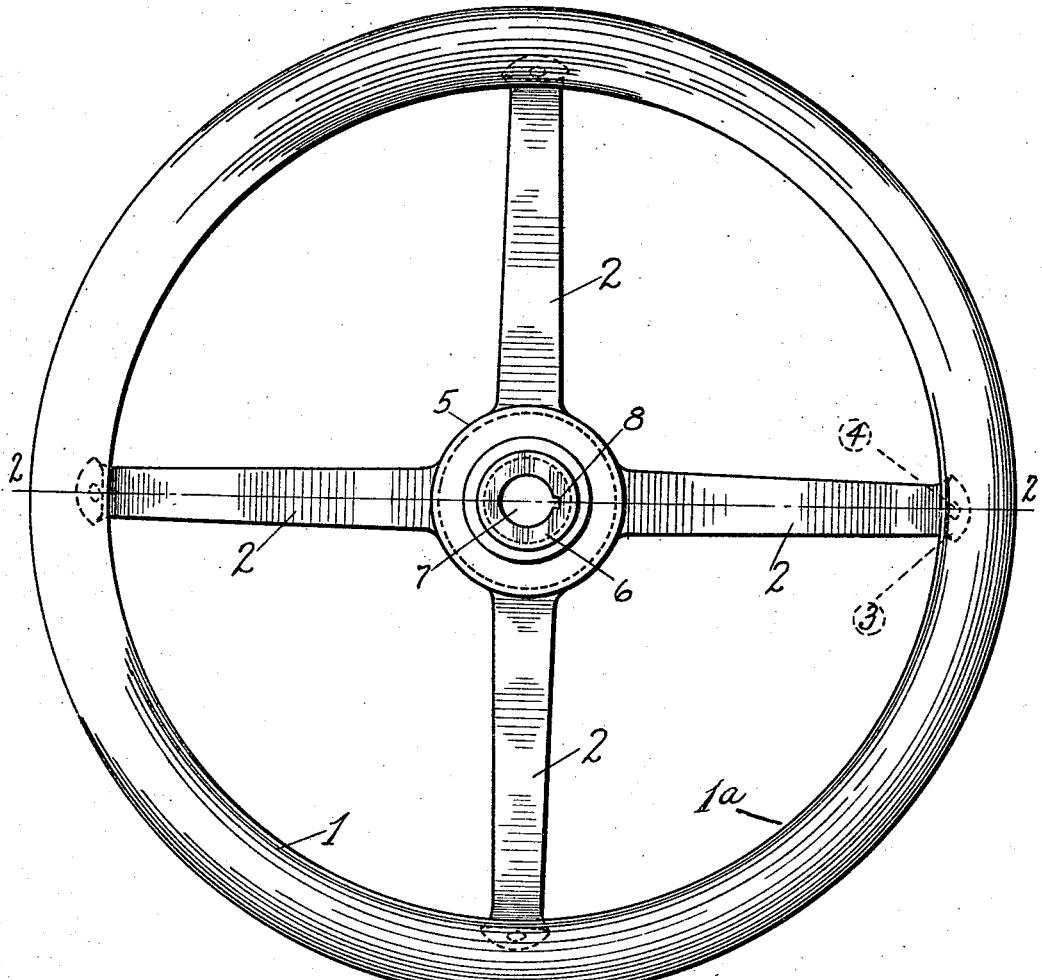
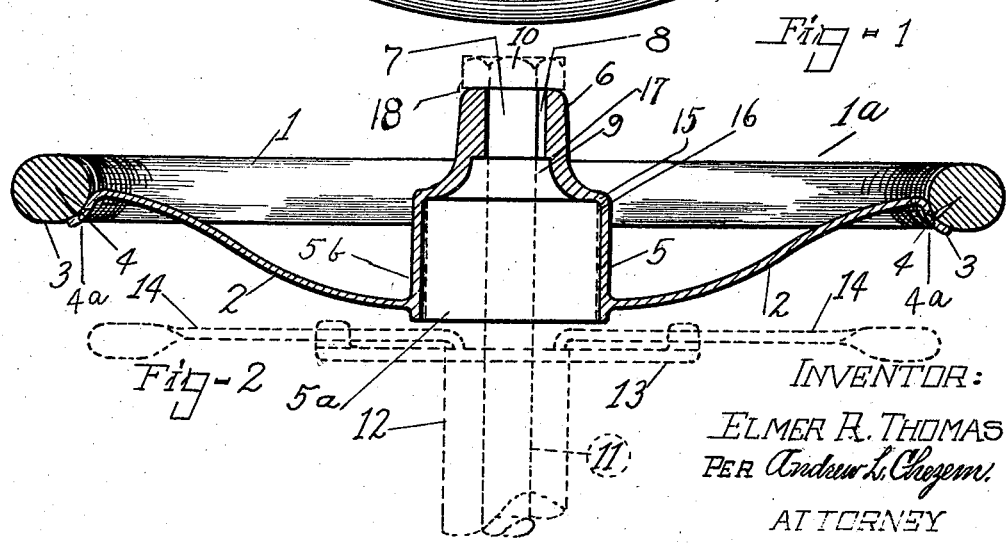
INVENTOR:
ELMER R. THOMAS
PER Andrew L. Chegems
ATTORNEY

UNITED STATES PATENT OFFICE.

ELMER R. THOMAS, OF DAVENPORT, IOWA.

STEERING WHEEL.

1,420,462.   Specification of Letters Patent.   Patented June 20, 1922.

Application filed May 16, 1921. Serial No. 469,785.

*To all whom it may concern:*

Be it known that I, ELMER R. THOMAS, a citizen of the United States, residing at Davenport, in the county of Scott and State of Iowa, have invented a new and useful Steering Wheel, of which the following is a specification.

My invention relates to improvements in steering wheels which are usually mounted upon a steering rod operating within a steering post which has a gear-box, steering gears and actuating levers mounted upon its uppermost end; and the object of my invention is to provide a steering wheel having a hub capable of housing the gear-box; the hub provided with spokes arranged thereon in relation to its rim in such manner as to form a wheel presenting a concave area when mounted, having its rim low enough to permit the proper manipulation of the actuating levers without necessitating the removal of the hand of the operator from the rim.

I attain these objects by the mechanism illustrated in the accompanying drawing, in which:

Figure 1 is a plan view of the wheel dismounted, and Fig. 2 is a vertical view of the wheel mounted in cross section taken on line 2—2, disclosing in dotted lines the gear-box, actuating levers, quadrant, steering post and steering rod of a vehicle.

Similar numerals refer to similar parts throughout the several views.

My invention consists of a wheel 1, composed of a rim 1ª, a plurality of curved spokes 2, and a hub 5, the rim 1ª being secured to the ends 3 of the spokes 2 by screw means 4ª, through holes 4 provided in the ends of the spokes 2, but may be secured thereon by any other suitable means, no invention being claimed in the manner of securing the rim to the spokes.

Hub 5 is provided with a plurality of spokes 2, radiating from the lower edge of its periphery. Spokes 2 are arranged in such close proximity to the bottom edge of the largest perimeter of hub 5 and are so curved and directioned with the small end 6 of the hub, as to give it the appearance of a half hub.

Hub 5 is outwardly formed by having a bell portion 5ᵇ, from the bottom of the periphery of which spokes 2 radiate, the bell portion 5ᵇ being of size suitable to enclose gear-box 5ª when mounted upon the upper end of a steering post 12, the upper extremity of the hub 5 being flanged as at 15, the flange directioned inwardly forming a neck 6, and lengthened in such manner as to allow its mouth end to protrude slightly past the upper periphery of the rim 1ª while the bell portion 5ᵇ is positioned so that the bottom rim of the said bell portion supporting the spokes may extend suitably below the rim 1ª, as desired.

The top of the neck 6 of the hub presents a flat surface, suited for securing the same upon the end of steering rod 11 by means of a nut 18, having a closed top 10.

The inner surface of hub 5 is formed with a bell portion 5ᵇ of size and shape corresponding to that of gear-box 5ª and suited for fitting over the same. At the top of the gear-box, hub 5 is provided with an inwardly directioned flange 16 to correspond with the top of gear-box 5ª, the flange 16 being so upwardly disposed as to conform with the top 9 of the gear-box 5ª at the top of gear-box 5ª. Hub 5 is also provided with another flange 17 above flange 16, conformable to the top 9 of the gear-box 5ª. The portion of hub 5 reaching from the first flange 16 to flange 17 at the top 9 of gear-box 5ª forming one part of the inner portion of the neck 6 above the flange 16, and that portion of hub 5 reaching from flange 17, to the top of hub 5 forming another portion of the neck 6, which latter portion is called the boxing portion 7. Boxing portion 7, is suited to receive the end of steering rod 11, and has a key way 8 lineally provided in its wall suited to receive key means in securing the hub 5 upon the steering rod 11.

I claim:

1. In connection with a vehicle having steering gear mounted upon a steering post within a gear-box, a steering wheel consisting of a hub, spokes and a rim; hub means having a plurality of upwardly curved spokes radiating from the bottom of the perimeter of the hub, the said spokes curved out of the line of their attachment to the said hub directioned toward its mouth and supporting said rim on their outer ends.

2. In a steering wheel comprising a hub; said hub inwardly having an enlarged portion formed into a housing conformable to the gear-box of a steering post and steering rod, the said housing having its top flanged, the said flange directioned inwardly in such manner as to conform to the top of a gear-box encased within the neck of the said hub.

3. In a steering wheel comprising a hub; said hub having a neck portion; said portion inwardly having a flange directioned in such manner as to inwardly, conjunctively form the top of a gear-box, and a boxing suited to receive the end of a steering post.

4. In a steering wheel comprising; in combination, a hub outwardly having one portion larger than the other, said large portion supporting plural radial spokes disposed upon the edge of one of its ends, a flange disposed at the other end of the said larger portion, the said flange inwardly directioned in such manner as to form a tapering neck; said hub inwardly having its said enlarged portion formed into a housing conformable to the gear-box of a steering post and steering rod said neck portion inwardly having another flange directioned in such manner as to inwardly, conjunctively form the top of a gear-box, and a boxing within said neck suited to receive the end of a steering post; key way means provided within the said boxing of the said neck, parallel therewith, all for the purposes specified.

ELMER R. THOMAS.

Witnesses:
BIRDIE A. CHEZERU,
FREDA B. SAATHOFF.